United States Patent [19]

Jones, Jr.

[11] Patent Number: 4,528,659
[45] Date of Patent: Jul. 9, 1985

[54] INTERLEAVED DIGITAL DATA AND VOICE COMMUNICATIONS SYSTEM APPARATUS AND METHOD

[75] Inventor: Gardner D. Jones, Jr., Raleigh, N.C.

[73] Assignee: International Business Machines Corporation, Armonk, N.Y.

[21] Appl. No.: 331,500

[22] Filed: Dec. 17, 1981

[51] Int. Cl.³ .............................................. H04J 6/02
[52] U.S. Cl. .................................... 370/80; 179/2 DP
[58] Field of Search ................. 370/80, 81; 179/2 DP

[56] References Cited

U.S. PATENT DOCUMENTS

| | | | |
|---|---|---|---|
| 3,303,285 | 2/1967 | Brown | 179/2 DP |
| 3,760,106 | 9/1973 | Monti | 370/80 |
| 3,882,280 | 5/1975 | Goutmann | 370/80 |
| 4,394,757 | 7/1983 | Muzumdar et al. | 179/2 DP |

FOREIGN PATENT DOCUMENTS 0003009 12/1978 European Pat. Off. .
1021927 3/1966 United Kingdom .

OTHER PUBLICATIONS

T. Kishimoto et al., "Simultaneous Transmission of Voice and Handwriting Signals: "Sketchphone System", IEEE, 1981, pp. 1982-1986.
R. C. Smith et al., "Voice/Data Concentrator", IBM Tech. Disc., vol. 21, No. 8, Jan. 1979, pp. 3066-3067.
Patent Abstracts of Japan, vol. 4, No. 141, 10-4-1980, p. 60E28; & JP-A-55 92 068 (Fujitsu K. K.) (12-7-80) Abstract.

*Primary Examiner*—Douglas W. Olms
*Assistant Examiner*—Wellington Chin
*Attorney, Agent, or Firm*—Edward H. Duffield

[57] ABSTRACT

The disclosed invention allows digital data to be integrated with a digital voice signal in a simple manner that does not affect the voice transmission quality. Digital data is inserted in quiet or "no speech" portions of the voice signal stream when such quiet periods are detected. No flags, headers, or other indications are necessary upon the insertion of digital data. The digital data is encoded in a two byte pattern in which the scaling bits are set high and the sign bit alternates in each eight bit byte. Four bits of each byte are thus reserved for scaling and sign purposes, but the remaining four bits are available for data transmission. Setting the three scaling bits high and alternating the sign bit has the effect of indicating to the receiver that voice is not present. This is so because the scaling bits and alternating sign bit will be decoded under the PCM coding technique to indicate an out of scale four kilohertz tone that is not allowable within the transmission path requirement of the Bell System or the CCITT in Europe. Recognition of such a signal by the receiver permits a detector to block the output at a speech terminal and to strip the scale bits from the input two byte patterns and pass the remaining bits as data to a data output.

11 Claims, 6 Drawing Figures

FIG. 5

PCM CODE BYTE

| S | T | U | V | W | X | Y | Z |

S = SIGN BIT (MOST SIGNIFICANT BIT)
T U V = SCALING BITS
W X Y Z = AMPLITUDE BITS
     (Z = LEAST SIGNIFICANT BIT)

| SPEECH INPUT SIGNAL RANGE (RELATIVE LEVEL) (IN DB.) | SCALE VALUE | MU-LAW COMPRESSED PCM CODE (SIGN BIT S NOT SHOWN) ||||||| 
|---|---|---|---|---|---|---|---|---|
| | | SCALING BITS ||| S | AMPLITUDE BITS ||||
| | | T | U | V | | W | X | Y | Z |
| 0 TO −6 | 128 | 1 | 1 | 1 | -- | 1 | 1 | 1 | 1 |
| | | 1 | 1 | 1 | -- | 0 | 0 | 0 | 0 |
| −6 TO −12 | 64 | 1 | 1 | 0 | -- | 1 | 1 | 1 | 1 |
| | | 1 | 1 | 0 | -- | 0 | 0 | 0 | 0 |
| −12 TO −18 | 32 | 1 | 0 | 1 | -- | 1 | 1 | 1 | 1 |
| | | 1 | 0 | 1 | -- | 0 | 0 | 0 | 0 |
| −18 TO −24 | 16 | 1 | 0 | 0 | -- | 1 | 1 | 1 | 1 |
| | | 1 | 0 | 0 | -- | 0 | 0 | 0 | 0 |
| −24 TO −30 | 8 | 0 | 1 | 1 | -- | 1 | 1 | 1 | 1 |
| | | 0 | 1 | 1 | -- | 0 | 0 | 0 | 0 |
| −30 TO −36 | 4 | 0 | 1 | 0 | -- | 1 | 1 | 1 | 1 |
| | | 0 | 1 | 0 | -- | 0 | 0 | 0 | 0 |
| −42 TO −48 | 2 | 0 | 0 | 1 | -- | 1 | 1 | 1 | 1 |
| | | 0 | 0 | 1 | -- | 0 | 0 | 0 | 0 |
| −48 TO −72 | 1 | 0 | 0 | 0 | -- | 1 | 1 | 1 | 1 |
| | | 0 | 0 | 0 | -- | 0 | 0 | 0 | 0 |

INTERLEAVED DIGITAL DATA AND VOICE COMMUNICATIONS SYSTEM APPARATUS AND METHOD

FIELD OF THE INVENTION

This invention relates generally to digital voice and data communications systems and techniques. Particularly, it relates to the integration of digitized voice and data signals for transmission on normal telephone communication links.

BACKGROUND AND PRIOR ART

A current high level of interest exists for integrating more function into common telephone systems. Advanced function telephones are viewed as requiring the ability to transmit both voice and data. In general, a new telephone terminal concept, well known in the industry, includes a telephone handset, a keyboard and a character display, at a minimum. Voice signals are quantized within the telephone instrument and encoded as a 64 kilobit per second pulse code modulation (PCM) signal stream by the telephone handset circuits. Transmission over a communications link to and from such a terminal is all in the form of digital patterns which may be encoded into an analog form for transmission if desired. A key problem in designing such a terminal is the design of the integration mechanism and technique for accommodating both digitized voice signals and digital data signals. Integration is necessary both from a functional and transmission viewpoint. Integration for transmission is desirable for office voice terminals because it simplifies the transmission scheme and makes the integration of data with the voice stream easier. However, integration is mandatory for a subscriber data terminal if it is to be applied to the communications link through the telephone system.

One such subscriber terminal has been described by Toru et al in an article entitled, "An Approach to Multiservice Subscriber Loop System using Packatized Voice/Data Terminals", appearing in the International Symposium on Subscriber Loops and Services, March, 1978, conference record, page 161. In this reference, one design for a future telephone terminal is set forth.

In the referenced article, the design taken is that for the digital voice signal to be integrated with the other terminal data sources by using packetized transmission techniques. Packetizing makes the voice signal compatible with the data transmission which is in packets. Also, packetizing the voice signal allows excess channel capacitiy available during silence gaps in the speech stream to be utilized for data transmission. The general approach described has been widely explored for optimizing transmission performance in integrated voice and data systems.

Equally well explored in the prior art are the problems of voice packet transmission. These problems include delay due to node buffering, controlled packet ordering, multipath timing jitter and other technical problems well known to those of skill in the art. The necessity of solving these problems creates a level of complexity and cost which is inconsistent with the basic objective of low cost professional or subscriber terminal service.

OBJECTS OF THE INVENTION

In view of the foregoing known difficulties with packetized data and voice interleaving transmission systems and apparatus, it is an object of this invention to provide an improved voice and data integration technique and system which avoids the requirement of voice packetization.

Another object of the present invention is to alleviate transmission delays due to buffering requirements for packetizing, controlled ordering of packets and the like by providing an asynchronous integration or interleaving technique and apparatus which transmits data during available portions of the voice signal stream in which voice is not present.

Yet another object of the present invention is to provide an improved interleaved digital voice and data communications system and method wherein no special headers, flags or the like need be inserted to deliniate a transition from voice mode communication to data mode nor to indicate the reverse transition from data mode back to voice mode.

SUMMARY

The present invention provides the foregoing improvements satisfying the objectives set forth in the following manner.

Data bits are integrated into the coded voice digital signal bit stream based on an observation that modern telephone link transmission standards for the compressed PCM voice coding contains many code points that cannot exist in a normal voice signal. In fact, such code points can be both transmitted and received over normal telephone systems, but would be excluded in analog filter requirements in a voice path. Such code points can be utilized for the transmission of data. The code points themselves present voice code violations that can be used for the transmission of data and can be detected in a mixed voice and data transmission signal quite easily for diversion to the proper output point. No header or other delimiter is necessary for distinguishing the beginning and the end of the voice signal gaps wherein the data is transmitted. Utilizing this method, digital voice signals to be transmitted are sent in the conventional manner unaffected by the insertion of data into the transmission path.

The particular code points of interest in the PCM coding procedure normally employed for voice communication in digital form are restricted by the allowable relative amplitude of speech samples that are permitted through the analog filters in the transmission path. These filters are tightly controlled and specified in both the U.S. and in Europe. The specifications for the transmission and reception filters include the characteristics of the compression law used in encoding the PCM signal. Both the Mu-law and the A-law compression used in Europe and elsewhere are compatible with this technique.

The specific input and output filter responses for an analog system limit the maximum allowable filter gain to negative 14 db at the 4 kilohertz frequency. This is because the 8 kilohertz sampling rate normally employed for the PCM transmission would exhibit significant aliasing at the 4 kilohertz frequency. The maximum scale of compressed PCM code which can be digitally encoded and transmitted within the limits of the filter requirements is thus significantly less than the maximum range of the code system employed. The highest scale levels would allow a relative signal level of between 0 and −6 db at this or other frequencies. The scaling bits in the PCM code will thus not be permitted to reach their maximum for voice signals. The maximum is defined when all three bits are set to a 1 (or "on" or high level).

If a tone at the 4 kilohertz frequency is to be transmitted, such a frequency and tone have a maximum allowable amplitude of −14 db by the conventions and regulations adopted for analog transmission. Four kilohertz frequency components can be easily identified at the 8 kilohertz sampling rate by the fact that the sign bit will alternate from + to − with each encoded byte.

Thus, during quiet portions of a speech pattern in which no speech is instantly present for encoding, data signals can be accommodated by artificially generating a series of scale bits and an alternating sign bit for combination with incoming data bits for transmission. These will be received at the receiver where the alternating sign bit will indicate a 4 kilohertz frequency and the scale bits will indicate a non-allowed amplitude for voice. This finding at the receiver facilitates an easy switching of the incoming stream to the data output as digital data instead of passing the incoming stream to the D to A converter for creating voice signals. The artificial creation of the nonallowed two byte pattern that cannot exist in normal speech transmissions allows the incorporation of at least four data bits per byte. This represents approximately 50% of the available bandwidth which may be employed for data transmission without sending delimiters, creating delays or interruptions, or otherwise interrupting the voice signal transmission. These data bits can be inserted asynchronously whenever the voice signal is quiet. Asynchronous as used herein is not meant to imply that the actual digital signals are not synchronously sent. It is meant to imply that the digital data is not transmitted on a regularly specified number of bytes per second since they are sent only when space is available during quiet periods of voice.

BRIEF DESCRIPTION OF THE DRAWINGS

The present invention will be further described with reference to a preferred embodiment as shown in the attached drawings in which:

FIG. 5 illustrates the Mu-law, PCM code compression conventions normally adopted for PCM code transmission.

DETAILED SPECIFICATION

Figure 1:
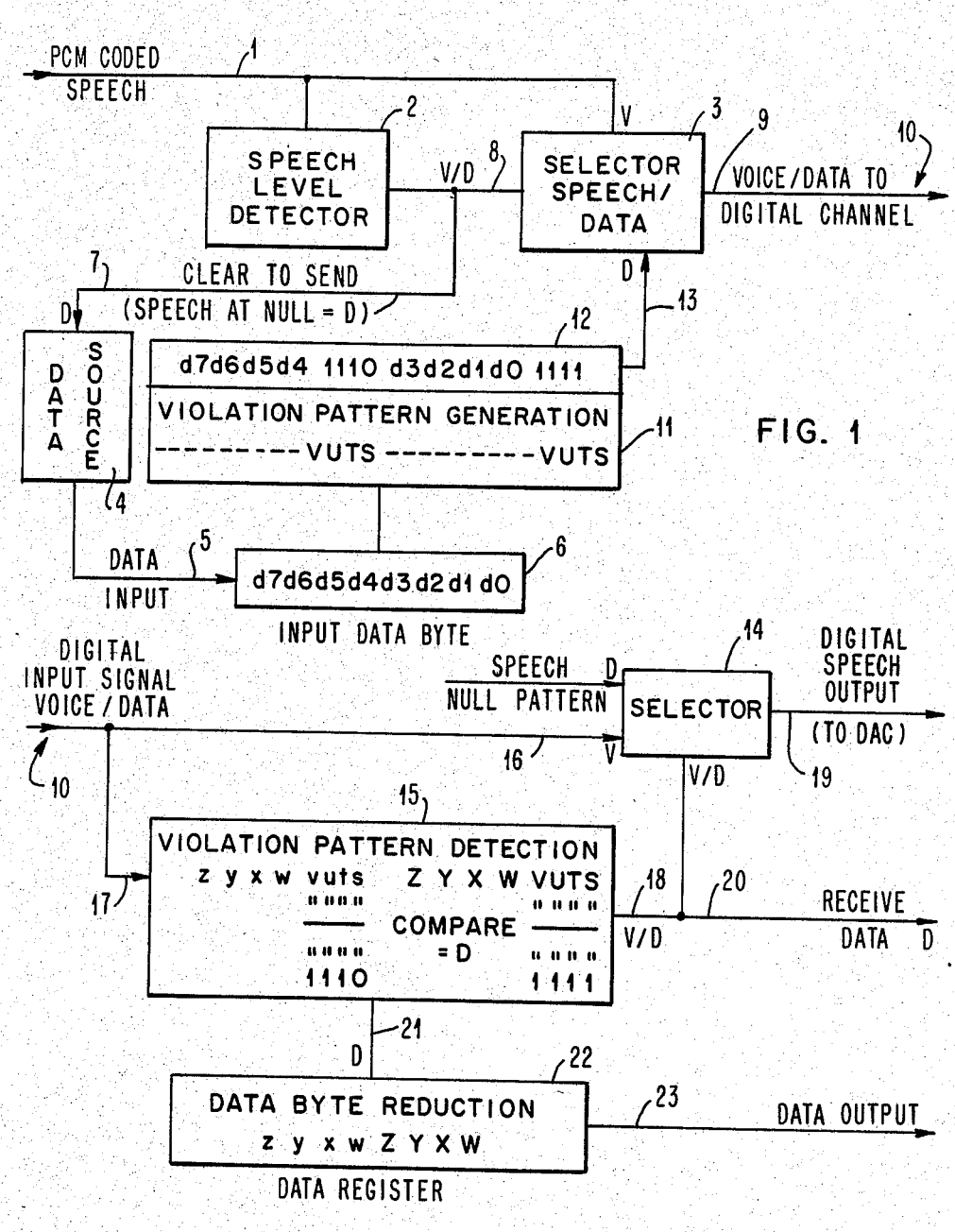
FIG. 1 illustrates an overall schematic diagram of the transmission system and its technique as employed in the preferred embodiment of the invention.

An overview of the communications system and method of the present invention is shown in FIG. 1. An input point 1 receives incoming PCM encoded speech signals from either a digital codec in a telephone handset or the like. These signals are applied simultaneously to a speech level detector circuit 2 and to a speech and data selector gate 3. Digital data input signals are supplied from a digital data source 4 to a data point 5. Input data may be buffered in a one byte buffer 6 as a series of 8 bits. These are identified as d7, d6, d5, d4, d3, d2, d1, d0.

The speech level detector 2 is well known in the art and can identify the absence of encoded speech either by the absence of signals entirely or by the fact that the scaling bits (as will be described in greater detail below) are all off and no amplitude bits are on. The speech level detector 2 supplies a clear to send signal on line 7 whenever a quiet period in the voice PCM coded stream is detected. The indication of quiet is also supplied at point 8 to an input of the speech and data selector switch 3. The speech and data selector switch 3 acts as a control means for gating either the PCM encoded speech signal or a digitally encoded data stream to an output port 9 for application to the data and voice transmission link 10.

The clear to send signal on line 7 can be applied to the data source 4 to indicate that bandwidth is available for sending digital data. Then data source 4 can supply digital bits to the input port 5 for grouping as shown in the buffer 6. Incoming digital data will be encoded in a series of two byte patterns in a violation pattern generation means 11. In the violation pattern generation 11, the three scaling bits V, U and T, as will be defined in greater detail below, and the sign bit S are caused to follow a prescribed pattern not present in normal voice transmissions. The pattern utilizes an alternation in the value of the sign bit in combination with a setting of the V, U and T bits to the 1 or on condition. A two byte pattern as shown in an output register 12 is thus generated. Four of the incoming data bits in the registers 6 are grouped with four bits of violation pattern code to form a single 8 bit byte. The remaining four bits of incoming data are grouped with another 4 bit violation code pattern to form a second 8 bit byte. These are supplied over line 13 to the control means in the selector switch 3 for application to the output port 9 for transmission over the communication link 10.

At the receiver end of the communication system, the communication link 10 supplies the incoming signal stream simultaneously to a speech signal selector 14 and to a data detector 15 at ports 16 and 17, respectively. The incoming digital stream at port 16 will normally be treated as an incoming digital voice signal provided that no violation patterns are detected in the pattern detection unit which detects the presence of data in box 15.

Data detector 15 actually checks for the presence of the violation code patterns entered by the violation pattern generator 11 in the transmitter. The data detector 15 contains the violation patterns for the V, U, T and S bits for each byte and a comparator unit for comparing the incoming bit stream against the violation pattern to detect the presence of data. A true comparison in each of two succeeding bytes indicate the presence of data and will create a data indication on the output line 18 for application to the voice selector 14. The input to voice selector 14 disables or degates the application of incoming signal stream to the digital speech output port 19. The output at port 18 also indicates that data is being received and supplies an indication on line 20 to a subscriber's terminal apparatus, not shown, indicating that received data is present.

The data detector 15 also supplies an output at its port 21 which is the input digital stream stripped of the V, U, T and S bits and combined into an 8 bit data byte pattern for application to register 22. This supplies the 8 bit bytes on an output 23 to the customer's data terminal, not shown.

The data detector 15 thus also serves a function as decoder since it strips the violation pattern bits V, U, T and S from each byte received when a true comparison of such bits exists.

Figure 2:
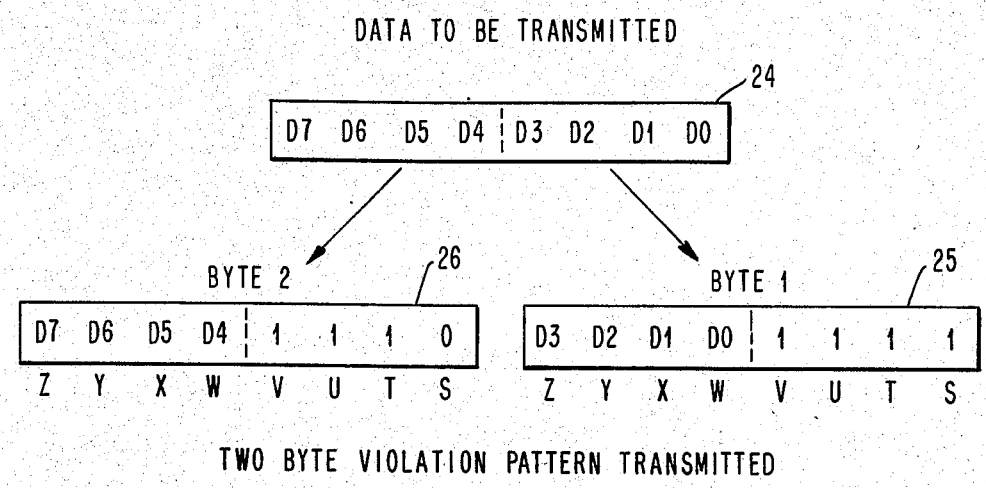
FIG. 2 illustrates schematically how a single 8-bit data byte is encoded into a two byte pattern for transmission.

Turning to FIG. 2, a more detailed example is shown in schematic form to indicate the nature of the encoding method employed for digital data. A digital data byte to be transmitted is schematically shown in block 24 and is encoded into two bytes of digital pattern for transmission as shown in blocks 25 and 26. The various data bits d0 through d7 are grouped in units of 4 bits each. They are placed in the high order bit positions of two successive data signal bytes labeled byte 1 and byte 2 as shown by blocks 25 and 26, respectively. In the normal PCM encoding format employed for transmission of digitized voice signals, the bits are labeled Z, Y, X, W, V, U, T and S with a significance to be described shortly. It should be noted in blocks 25 and 26 that the S bits alternate value with the S bit in block 25 being a 1 while that in block 26 is a 0. It should be understood that any successive bytes would similarly alternate 1 and 0, although the order of 1 and 0 alternation is immaterial once it is established. The V, U and T bits are all set to a 1 in both blocks 25 and 26 as shown, the purpose of which will be described shortly.

Figure 3:
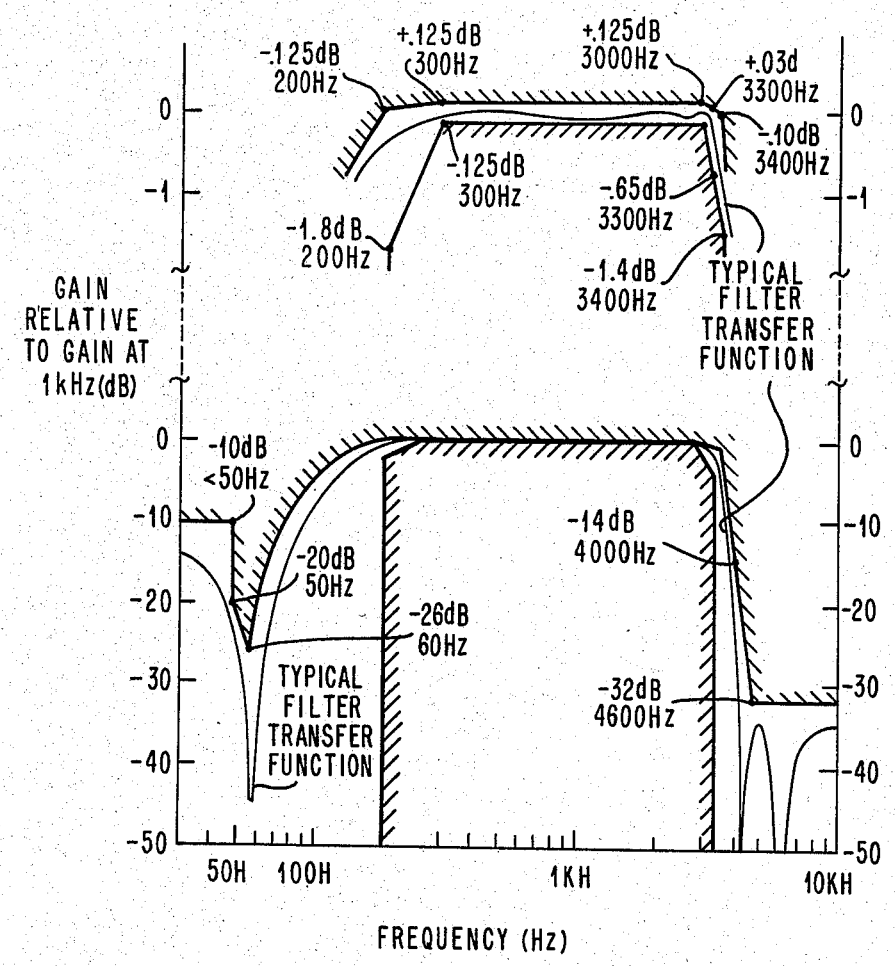
FIG. 3 illustrates a typical CCITT specification for a transmission filter.

Turning to FIG. 3, a typical telephone company transmitting filter specification or CCITT communicating receiving filter specification is shown. The filter characteristic is intended for analog signals and carefully specifies the band within which analog signals will be passed by the telephone communications equipment. Digital signals are transmitted normally by any of a variety of communication signalling techniques of either analog or digital form, the specific choice of which is immaterial in the present invention. However, once the signals have been received and properly amplified and corrected for distortions, etc., they must subscribe to the filter characteristics specified in order for the telephone system apparatus to properly transmit them in analog form as voice.

The normal specification shown by FIG. 3 is important at the 4 kilohertz frequency in particular since, when a normal 8 kilohertz sampling rate for PCM encoding is employed, the 4 kilohertz frequency can exhibit significant aliasing. In laymen's terms, this would generate a significant amount of energy at the 4 kilohertz frequency as a result of the 8 kilohertz sampling rate. In order to reduce the annoying effect of such a tone that would be transmitted, the transmitting filter specification requires that the input signal energy at the 4 kilohertz frequency be at least 14 db below the 0 db reference at 1000 hertz input. Tones at the 4000 hertz frequency exhibiting higher energies will be clipped by the telephone transmission system. The import of this finding is that the telephone company specifications require that energy input to the system at the transmitter must not actually exceed 14 db below the 1000 hz. reference input at 4000 hertz. However, the PCM code format to be described shortly includes code points that could encode the presence of energy at 4000 hertz at significantly higher levels than the filter characteristics would actually permit to pass in analog form. This may be taken advantage of in the present invention as will be seen shortly.

Figure 4:
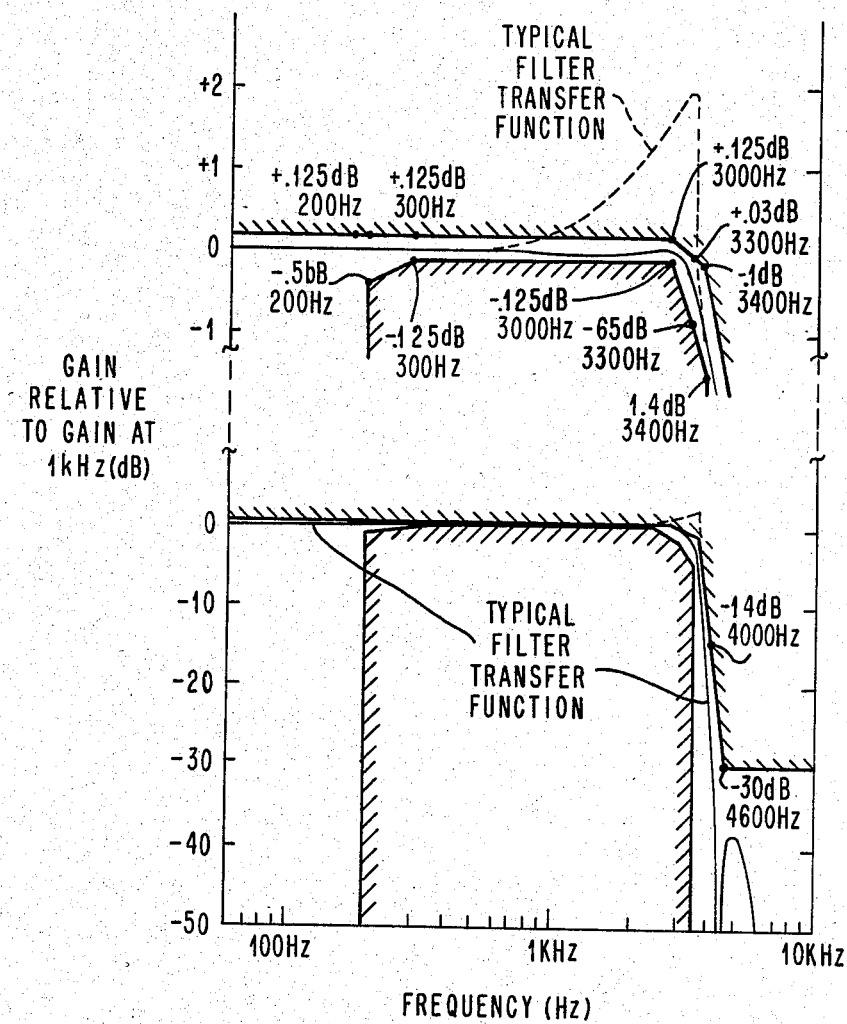
FIG. 4 illustrates a typical CCITT specification for a reception filter.

Turning to FIG. 4, a typical reception filter specification curve for the telephone company or CCITT is shown. While the overall shape differs slightly in the lower frequency, it will be observed that the same requirement at the 4000 hertz frequency exists as with the transmit filter described in FIG. 3. However, turning to FIG. 5, a realization is made as follows.

In FIG. 5, the well known Mu-law PCM code compression scheme is illustrated. By the Mu-law code compression well known in the art, a series of eight amplitude scale ranges are established for the input speech signal relative to an input at 1000 hertz as 0 db. These eight ranges are shown in the table of FIG. 5 and have scale values ranging from the relative amplitude of 128 with a signal level of 0 to −6 db down to a scale value of 1 with signal ranges in the level of −48 to −72 db. The S bit (the sign bit) is the most significant bit but is not shown in the table of FIG. 5, the value of the bit being generally dependent upon whether the incoming amplitude sampled is above or below that of the previous sample, i.e., whether the incoming signal is rising or falling. Three scaling bits T, U and V have various digital values within the various scale of value ranges as shown in the chart. The amplitude bits are arbitrary and can take on any value from all 0's to all 1's (inclusive) as indicated in the chart.

Now it is a fact that at a 4000 hertz frequency, when sampling is conducted at 8000 hertz, the sign bit will alternate in value from + to − since the 4000 hertz analog signal will be sampled alternately at rising and falling points in successive samples at such a rate. Therefore, if one applies the filtering requirements shown in FIG. 3 to the table in FIG. 5, it will be seen that the permissible speech input signal range at 4000 hz will be −12 to −18 db below the reference input level and that the scaling bits T, U and V will not all take on the value of 1.

By assigning an alternating sign bit in combination with scaling bits set to a value of all 1's, the PCM code can be forced to represent a signal at 4 kilohertz beyond the permissible input levels for actual transmission in analog form through the telephone system. This is not to say that the digital information of such a code cannot be passed by the normal telephone system, but the analog signals which would generate such a tone and amplitude will not be passed by telephone company filters or by equipment which is permissibly attachable to telephone company communications equipment. Such PCM encoded digital signals can, however, be transmitted from end to end for detection at the receiver, there to strip out any bytes containing the violation patterns with T, U, V set to a 1 and the S bit alternating byte to byte to prevent these being applied to the analog generation circuit to recreate an invalid level of voice signals.

Figure 6:
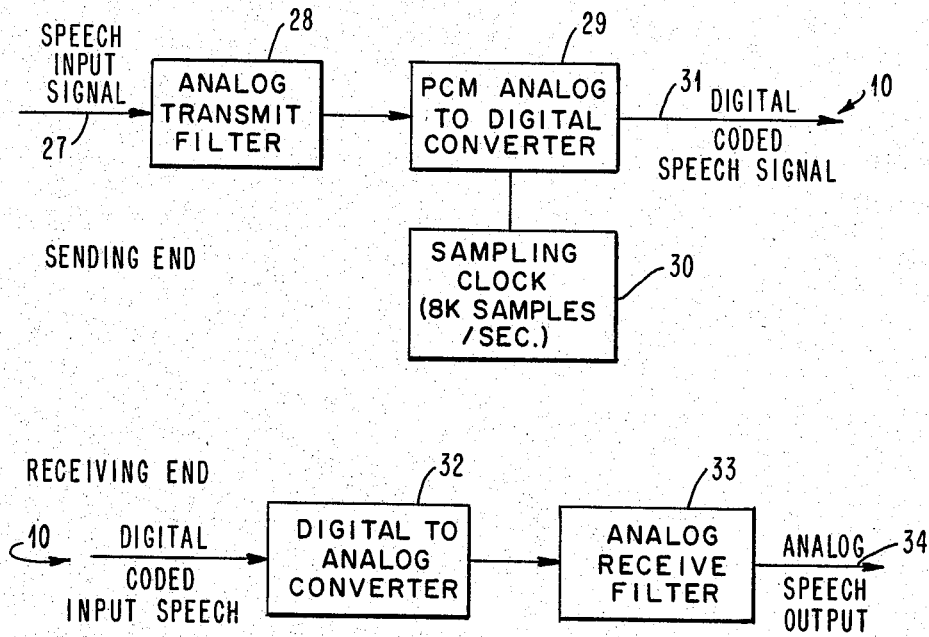
FIG. 6 illustrates the general arrangement of the known prior art PCM voice communications system and communication link.

FIG. 6 shows the general prior art arrangement of an existing telephone communication system for digital speech as contemplated for use in the present invention. Speech input on line 27 is in the analog form and passes through a telephone company analog transmission filter 28 from which it is applied to the PCM sampling and coding circuit 29 driven by an 8 kilohertz sampling clock 30. The output from the PCM A to D converter 29 appears on line 31 for application to the communications link 10 as a digitally encoded speech signal. It is received on the communication link 10 at the receiver and is run into a digital to analog converter 32 and from thence through an analog receiving filter 33 to recreate an analog speech output at port 34. All these features are well known in the art and form no specific part of the present invention. However, for purposes of explanation, it may be noted that the analog transmit filter 28 and the analog receive filter 33 must conform to the specifications described in FIGS. 3 and 4. Therefore, it may be seen that no analog speech signals will be passed which exceed the allowable levels at 4000 hertz. However, the PCM code format employed for encoding the digitized samples of the speech signal to create the digital form for transmission has a greater range than that necessary at the 4 kilohertz frequency as may be seen in FIG. 5. This range is employed in the present invention for the transmission of digital data.

The present invention is based on the observation that the present standards for compressed PCM voice coding contain excess code points not normally used in actual transmission of voice at the 4000 hertz frequencies in particular. There are other frequencies besides 4000 hertz at which the total range of the PCM code format may also not be employed and these could be used for the passage of data. However, detection of these other frequencies in the digital form may be more complex. It is within the scope of the present invention to employ other frequencies but the preferred embodiment is described and illustrated with the 4000 hertz frequency since it is the easiest to build.

The code points not employed during normal speech transmission at the 4000 hertz frequency are used for the transmission of data and can be easily detected in a mixed voice and data digital transmission signal for diversion to the proper output port. Neither a header nor other delimitation is necessary for distinguishing the beginning and end of data transmission within the digitized voice signal stream during voice signal gaps. Utilizing the method and apparatus of the present invention, the digital voice signal is transmitted in the conventional manner unaffected by the insertion of data in the transmission path during quiet portions of the voice signal itself.

Returning to FIG. 5, it may be noted in the table that the T, U, and V scaling bits cannot all equal 1 for a tone at 4000 hertz since this would exceed the allowable filter gain of $-14$ db and would represent a relative signal level of at least $-6$ db. (As previously noted, the sign bit S will alternate with an 8 kilohertz sampling rate at the 4000 hz tone frequency.)

Therefore, there exists a two byte pattern which can be generated but which cannot be allowed to exist in normal speech transmission. In this pattern, the sign bit S will alternate value from byte to byte while the scaling bits T, U and V will all be set to a one. FIG. 2 shows such a two byte pattern. It is equivalent to the coding of an input signal concentrated at 4 kilohertz with a level of at least $-6$ db. Such a level at 4 kilohertz frequency is not permitted by the response characteristics of the input transmission filter when a voice coder is scaled to transmit an input speech signal at its specified level. The violation condition is completely determined by setting the scaling bits T, U and V since they specify the minimum level in the code scale range as shown by FIG. 5. The linear bits normally employed for amplitude representation W, X, Y and Z are not significant since a violation condition will exist for any code point in the scaling range determined by T, U and V equals 1. It may be noted that there is at least a 6 db margin of safety in the pattern since the next lowest code scale range T and U=1, V=0 will not be permitted by the filter characteristics either. It is only necessary to associate the maximum code range with the 4 kilohertz frequency component through a pattern of two bytes using an alternating sign bit in order to provide an indication at the receiving end that can be used for extracting data from the incoming stream instead of voice.

During speech gaps or periods of silence when no voice signal is present, incoming data bits can be grouped in 4-bit patterns with a 4-bit violation pattern to form an 8-bit byte as shown in FIG. 2. Two successive bytes are required for the transmission of 8 bits of data and to clearly indicate, by alternation of the S bit value, that the 4 kilohertz detection point is set. It is apparent, therefore, that during speech gaps on a 64 kilobit channel, at least a 32 kilobit per second channel bandwidth is available for data transmission.

The filter specifications shown in FIGS. 3 and 4 are generally exceeded with some margin by many vendor filter components. This gives greater rejection at 4 kilohertz than the actual specifications require and further insure the integrity of the violation pattern employed in the present invention. Furthermore, the normal power spectrum distribution in human speech is such that little power is present at the 4 kilohertz frequency. It is thus very unlikely that a violation pattern will occur spontaneously even with a minimal filter transmission characteristic. With the specified filter requirements as shown in the figures, the violation pattern will be prevented from occurring spontaneously for either arbitrary analog inputs such as noise, etc., and speech as well.

Returning to FIG. 1, the overall block diagram of a voice and data communications system of the present invention and its method of implementation are described. Gaps or quiet portions in the coded speech signal are detected by a voice detection circuit 2. There are several well known devices and procedures for implementing this function and these are employed by the telephone company, specifically the AT&T Company's TASI System, Comsat Company's DSI System, etc., and need not be detailed further here since they are well known to those of skill in the art. Briefly, the speech level detector may rely upon the absence or non-existence of bits in the amplitude range together with the absence of scale bits to define the fact that speech is not present. Actual analog circuits at the transmitter for detecting the absence of incoming analog speech are numerous. While these are utilized in general, they are not described with reference to the present invention since they are commonly known and available to those of skill in the art.

Once a gap in speech has been detected by the detector 2, a clear to send signal can be applied as the result of the detection and sent on line 7 to a data source 4 to initiate transmission of data. The data path is established by embedding a byte of data in each two byte violation pattern as shown in FIG. 2. Incoming data from the data source 4 is applied at a terminal 5 in FIG. 1. The 8 bits of data are arranged as shown in the representative register 6 and are logically divided into groups of 4 bits for combination with 4 bit violation patterns in the violation pattern generator 11. This may be simply a register with the 4 low order bit positions out of each 8 bits representing V, U, T and S set as shown in the output section 12. The four high order bits for each byte in the output section 12 can be the data bits d0 through d3 and d4 through d7, respectively, as shown. The resulting output on line 13 goes to a speech and data selector switch or control means 3 for eventual gating at port 9 to the communications link 10.

At the receiving end, the communications link 10 provides, after suitable amplification, noise filtering and correction for distortion, a series of digital data signals which are applied at input ports 16 and 17 to the digital speech selector 14 or to the decoder 15. Decoder 15 continuously compares the four low order bits in each byte against the known violation code pattern as shown. When a true comparison exists, an indication at port 18 is given which is applied to the voice and data selector 14 to degate the output as digital speech and to permit an indication on line 20 of "receive data" to be given to the customer's data handling apparatus, not shown. An output on port 21 from the decoder 15 supplies the 8 bit bytes stripped of the violation pattern bits into a register 22 for delivery on line 23 to the customer's data handling equipment.

An annoying click in the receiver which would be heard by human listeners can be avoided by inserting a null or silence pattern in the speech receiver at the selector 14 in response to the detection of the violation pattern in detector and decoder 15. The details of this are not shown but would be well known to those of skill in the art. The pattern thus provided can be a null byte which is all 0's or the PCM representation of low level random noise signals which provides a gentle hiss in a listener's ear.

When speech signals resume, as will be indicated by the onset of a speech burst and will be detected in the speech level detector 2 at the transmitter, the maximum delay in transferring from the data mode to the voice mode will be two bytes of length or 250 microseconds at normal transmission frequency. This small delay will cause no problems since the speech signals can have as much as 5 to 10 milliseconds of front end clipping or chopping on the incidence of a speech burst without degradation of the received speech quality. At the receiving end, the detection of the first double byte which does not contain the violation pattern is used to divert the transmission from the data sink to the receiver circuits, thereby replacing the silence patterns. The received data signal on line 20 will be dropped to indicate to the data interface that data transmission is ending temporarily.

The transmission and receiving method of the present invention as described above can be enhanced, if necessary, by the use of more violation code patterns.

For example, once the data channel has been established by the sequence of an initial pattern, variations of the U and V bits can be used for additional data or control information with negligible probabilities that the overall sequence will occur in a normal speech transmission pattern. Also, it is not necessary to violate all three scaling bits or to create a two-byte pattern. The basic approach is clearly broader in scope since the violation principle allows for numerous code points where only one scaling bit in a single byte could be used to establish a violation. The alternating sign bit of the preferred embodiment is also not required in the broadest sense because other freqeuncies than 4000 Hz can be used.

The technique of using the violation pattern was described in the present invention for the context of transmitting general data in a voice bit stream. The technique can quite obviously be used to convey voice related data such as by transmitting voice call control information through a digital PBX or trunk system. In this use, the voice threshold function may not be necessary. Control information such as call set up (dialing) instructions would occur before the speech is transmitted and other signals such as camp on line, call waiting, etc., could be inserted directly in the voice signal with negligible degradation of the voice output. Other applications for the technique can include data inserted in a bit stream with run length encoded information to preinform the receiver of the speech gap length or speech length. This information can be used for speech filing or message store and forward systems.

Having thus described the invention with relationship to the preferred embodiment shown, it will be evident to those of skill in the art that the general technique of the present invention represents a communications method of a new and unobvious sort in its own right. In addition, the representative preferred embodiment of the apparatus for realizing the technique can be either hard wired logic or software implemented routines since it is a digital bit stream that is being operated upon to either construct or decode the violation patterns and to insert or extract the data bits as shown.

Therefore, having described the invention with relation to a preferred embodiment illustrating the method and apparatus of the invention, what is claimed and desired to be protected by Letters Patent is set forth in the following claims.

1. An interleaved digitized voice and data communications system, comprising:
   a digitized data and voice transmitter and a digitized data and voice receiver, and a communications link connecting said transmitter and said receiver;
   said transmitter comprising a voice input and a data input and means for detecting the momentary absence of voice signals, said detecting means being connected to said voice input;
   controlling means responsive to the detection of momentary absence of voice signals by said detecting means and connected to said detecting means for controlling the admission of data signals from said data input into said transmitter and for connecting said voice or data signals, respectively, to said communications link;
   a digital bit pattern generator means for generating a digital pattern code not used as a normal voice signal code;
   encoding means connected to said digital bit pattern generator and to said data input for encoding a combined digital pattern code and data pattern having at least one scaling bit altered to a condition not used for voice transmission; and
   means for supplying said encoded patterns to said controlling means, said controlling means applying said patterns to said communication link;
   said digital data and voice receiver comprising a communications link input connection to said receiver and a digital speech output port and a digital data output port therefrom;
   digital pattern code detecting means connected to said input and a selector means connected to said input;
   said selector means being connected to said pattern detecting means and responsive to an indication therefrom that no said pattern code exists for applying the signals from said input connection to said digital speech output and responsive to an indication of the presence of a pattern code therefrom for blocking any signal application to said digital speech output; and
   data byte decoder means connected to said pattern code detecting means and to said digital data output for removing said pattern code from said combined digital pattern code and data pattern and applying a digital data byte at said output for each combined digital data and encoded pattern input supplied thereto.

2. The system as described in claim 1 and further comprising:

a clear to send output signal line connected to said means for detecting the absence of voice signals for initiating release of data bit information from a data source connected to said data input of said transmitter; and a received data output signal indicator connected to said data detection means at said receiver for indicating to a data sink the initiation or termination of data reception.

3. In a PCM encoded digital voice communications system, a method of transmitting non-voice digital data, comprising:

a first step of detecting the absence of incoming PCM coded speech signals at said transmitter;

a second step responsive to said first step of generating a code pattern of scaling bits not used in PCM coded speech signals and for applying said pattern to an output port for transmission on a communications link.

4. The method as described in claim 3, further including the steps of:

combining said code pattern with digital data bits for transmission in a format wherein said pattern generating step comprises the additional step of alternating the sign bit.

5. The method of claim 3 further comprising step of:

receiving incoming digital bit stream signals at a receiver;

detecting the presence of said code pattern; and responsive to said detection of a code pattern, interrupting output of digital speech code and initiating output of digital data codes.

6. A method as described in claim 5, further comprising the steps of:

removing said code pattern from said incoming signal stream and grouping data bits which remain together into bytes for output.

7. An interleaved digitized voice and data communications system, comprising:

a digitized data and voice transmitter and a digitized data and voice receiver and a communications link connecting said transmitter and said receiver;

said transmitter comprising a voice input and a data input and means for detecting the momentary absence of voice signals, said detecting means being connected to said voice input;

controlling means responsive to the detection of momentary absence of voice signals by said detecting means connected to said detecting means for controlling the admission of data signals from said data input into said transmitter and for connecting said voice or data signals, respectively, to said communications link;

a digital bit pattern generator means for generating a digital pattern code not used as a normal voice signal code;

encoding means connected to said digital bit pattern generator to said data input for encoding a combined digital code and data pattern of two bytes in length for each byte of data received, said two byte pattern having an alternating sign bit in each byte and having scaling bits in each byte altered to a condition not used for voice transmission; and means for supplying said encoded two-byte patterns to said controlling means, said controlling means applying said patterns to said communication link;

said digital data and voice receiver comprising a communications link input connection to said receiver and a digital speech output port and a digital data ouput port therefrom;

digital two-byte pattern detecting means connected to said input and a selector means connected to said input;

said selector means being connected to said pattern detecting means and responsive to an indication therefrom that no said two-byte pattern exists for applying the signals from said input connection to said digital speech output and responsive to an indication of the presence of a said two-byte pattern therefrom for blocking any signal application to said digital speech output; and data byte decoder means connected to said two-byte pattern detecting means and to said digital data output for removing said pattern from said combined digital and data two byte encoded patterns and supplying a digital data byte at said output for each combined two byte digital data and encoded pattern input supplied thereto.

8. A system as described in claim 7, further comprising:

more than one said scaling bit in each byte is altered to said condition not used for voice transmission.

9. The method as described in claim 4, wherein said combining step further comprises:

combining said code pattern with digital data bits for transmission in a two-byte format.

10. The method of claim 9, further comprising the steps of:

receiving incoming digital bit stream signals at a receiver;

detecting the presence of said code pattern; and responsive to said detection of said code pattern, interrupting output of digital speech code and initiating output of digital data codes.

11. A method as described in claim 10, further comprising the steps of:

removing said code pattern from said incoming signal stream and grouping data bits which remain together into bytes for output.

* * * * *